(12) United States Patent
Joo

(10) Patent No.: US 7,864,782 B2
(45) Date of Patent: Jan. 4, 2011

(54) PACKET PROCESSING APPARATUS AND METHOD

(75) Inventor: Min-Kyu Joo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 958 days.

(21) Appl. No.: 11/523,050

(22) Filed: Sep. 19, 2006

(65) Prior Publication Data

US 2007/0165648 A1  Jul. 19, 2007

(30) Foreign Application Priority Data

Jan. 16, 2006 (KR) ...................... 10-2006-0004588

(51) Int. Cl.
*H04L 12/56* (2006.01)
(52) U.S. Cl. .................. 370/395.54; 370/400
(58) Field of Classification Search ............. 370/395.54
See application file for complete search history.

(56) References Cited

U.S. PATENT DOCUMENTS

| | | | |
|---|---|---|---|
| 6,101,188 A * | 8/2000 | Sekine et al. ............... | 370/401 |
| 6,574,240 B1 * | 6/2003 | Tzeng ........................ | 370/469 |
| 6,697,862 B1 * | 2/2004 | Beser et al. ................. | 709/226 |
| 2003/0048501 A1 * | 3/2003 | Guess et al. ................ | 359/118 |
| 2005/0083917 A1 * | 4/2005 | Okamoto et al. ............ | 370/352 |
| 2008/0137580 A1 * | 6/2008 | Axelsson et al. ............ | 370/315 |

* cited by examiner

*Primary Examiner*—Chirag G Shah
*Assistant Examiner*—Daniel Mitchell
(74) *Attorney, Agent, or Firm*—H.C. Park & Associates, PLC

(57) ABSTRACT

In a packet processing apparatus and method in an ethernet switching system, an introduced packet is discarded by switching to a dummy port instead of trapping the packet until a layer 3 table of an ethernet switch chip is updated, thereby operating an Address Resolution Protocol (ARP) after having minimized a central processing unit (CPU) load. The packet processing apparatus, upon receipt of a first packet headed for a destination Internet protocol (IP) address not existing in the packet processing unit from a source host, transmits an ARP request packet to the destination IP address so as to acquire routing information of a destination host. When the packet processing apparatus receives a second packet headed for the IP address of the destination host from the source host before an ARP response packet is received in accordance with the ARP request packet and before the routing information corresponding to the IP address of the destination host is acquired, it switches the packet based on imaginary routing information.

20 Claims, 2 Drawing Sheets

PACKET PROCESSING APPARATUS AND METHOD

CLAIM OF PRIORITY

This application makes reference to, incorporates the same herein, and claims all benefits accruing under 35 U.S.C. §119 from an application for APPARATUS AND METHOD FOR PROCESSING PACKET, filed in the Korean Intellectual Property Office on the 16 Jan. 2006 and there duly assigned Serial No. 10-2006-0004588.

BACKGROUND OF THE INVENTION

1. Technical Field

The present invention relates to a packet processing apparatus and method. More particularly, the present invention relates to a packet processing apparatus and method in an ethernet switch system which provides layer 2/3 switch functions based on an ethernet switch chip. The packet processing apparatus and method of the invention, even if overloaded with packets, can actively update Internet Protocol/Media Access Control (IP/MAC) address information of a next hop necessary for ethernet switch chip-based Internet Protocol (IP) switching in order to transmit the packets to destination hosts.

2. Description of the Related Art

In general, an Internet Protocol (IP) address and a Media Access Control (MAC) address of source and destination hosts are inevitably necessary in order to use an ethernet switching-based layer 3 switch (IP routing) function in a layer 2 (based on MAC) and layer 3 (based on IP) switching apparatus based on an ethernet switch chip.

In order to update IP address and MAC address information of a destination host, the ethernet switch chip traps a packet, even if it is headed for an IP address not existing in the layer 3, and this causes the following problems.

First, since packet trapping by the ethernet switch chip continues until a corresponding layer 3 table is updated, the central processing unit (CPU) will be overloaded with packets to the extent that it cannot transmit Address Resolution Protocol (ARP) packets. This may become worse if the ethernet switch chip has a larger bandwidth.

Second, if a packet received from a source host is headed for an IP address that does not exist in the layer 3 table, the CPU will repeatedly transmit ARP packets to a destination host. This will cause a problem of CPU overload and will waste network bandwidth.

Third, as layer 3 table update based on ARP has the above-mentioned problems, when an innocent packet headed for a wide IP bandwidth is received with priority to other packets, the CPU successively generates a large amount of ARP packets. This results in CPU overload and waste in network bandwidth while endangering network security.

In order to operate ARP by means of the CPU, only one packet per corresponding IP address should be trapped to the CPU. However, the ethernet switch chip does not support such a function, and thus a measure to trap packets as little as possible to the CPU is still required.

SUMMARY OF THE INVENTION

The present invention has been developed to solve the foregoing problems, and it is therefore an object of the present invention to provide a packet processing apparatus and method in an ethernet switching system, which apparatus and method discard an introduced packet by switching to a dummy port instead of trapping the packet until a layer 3 table of an ethernet switch chip is updated, thereby operating Address Resolution Protocol (ARP) after having minimized central processing unit (CPU) load.

According to an aspect of the invention for realizing the above objects, a packet processing method in an ethernet switch system comprises the steps of: if a routing table does not have routing information corresponding to the Internet Protocol (IP) address of a destination host of a first packet transmitted from a source host, setting imaginary routing information corresponding to the IP address of the destination host in the routing table and transmitting an ARP request packet to the IP address of the destination host so as to acquire routing information of the destination host; and, upon receiving a second packet headed for the IP address of the destination host from the source host before an ARP response packet is received in accordance with the ARP request packet and before the routing information corresponding to the IP address of the destination host is acquired, switching the second packet based on the imaginary routing information set in the routing table.

The routing table preferably comprises a layer 3 routing table, and the imaginary routing information stored in the routing table preferably includes at least one of imaginary Media Access Control (MAC) address corresponding to the IP address of the destination host and dummy port information.

The ARP request packet-transmitting step preferably comprises transmitting the ARP request packet to the destination host by a preset number.

The packet processing method also preferably comprises: if the ARP response packet in accordance with the ARP request packet is not received from the destination host by the preset number, canceling the imaginary MAC address and the dummy port information from the routing table; and, upon receiving a third packet from the source host, resetting new imaginary routing information including imaginary MAC address and dummy port information, and based on the reset imaginary routing information, transmitting a second ARP request packet to a second destination host to acquire actual routing information of the second destination host.

The packet processing method also preferably comprises: if the ARP response packet in accordance with the ARP request packet is received from the destination host by the preset number, updating the routing table with MAC address and port information, included in the ARP response message, which correspond to the IP address of the destination host.

The packet processing method also preferably comprises: if a fourth packet headed for the IP address of the destination host is received from the source host after the routing table is updated, switching the fourth packet to a port corresponding to the MAC address information updated into the routing table to transmit to the destination host.

According to another aspect of the invention for realizing the above objects, a packet processing method in an ethernet switch system, which includes an ethernet switch chip having a routing table and a CPU, comprises the steps of: at the ethernet switch chip, if the routing table does not have routing information corresponding to the IP address of a destination host of a first packet transmitted from a source host, trapping the packet to the CPU; at the CPU, setting imaginary MAC address and dummy port information corresponding to the IP address of the destination host of the trapped first packet into the routing table of the ethernet switch, and transmitting an ARP request packet to the IP address of the destination host so as to acquire MAC address and port information of the destination host; and, at the ethernet switch chip, upon receiving a second packet headed for the IP address of the destination host from the source host before an ARP response packet is received in accordance with the ARP request packet and before the routing information corresponding to the IP address of the destination host is acquired, switching the second packet to a dummy port set in the routing table of the ethernet switch chip without trapping the packet to the CPU.

The ARP request packet-transmitting step preferably comprises transmitting the ARP request packet to the destination host by a preset number.

The packet processing method also preferably comprises: at the CPU, if the ARP response packet in accordance with the ARP request packet is not received from the destination host by the preset number, canceling the imaginary MAC address and the dummy port information from the routing table of the ethernet switch chip, and upon receiving a third packet from the source host, resetting new imaginary routing information including imaginary MAC address and dummy port information in the routing table, and based on the reset imaginary routing information, transmitting a second ARP request packet to a second destination host so as to acquire actual routing information of the second destination host.

The packet processing method also preferably comprises: at the CPU, if the ARP response packet in accordance with the ARP request packet is received from the destination host by the preset number, updating the routing table with MAC address and port information, included in the ARP response message, which correspond to the IP address of the destination host.

Furthermore, the packet processing method further comprises: if a fourth packet headed for the IP address of the destination host is received from the source host after the routing table is updated, switching the fourth packet to a port corresponding to the MAC address information updated into the routing table to transmit to the destination host.

According to a further aspect of the invention for realizing the above objects, an ethernet switch system comprises a packet processing unit, wherein the packet processing unit is responsive to receipt of a first packet headed for a destination IP address not existing in the packet processing unit from a source host for transmitting an ARP request packet to the destination IP address so as to acquire routing information of a destination host, and is responsive to receipt of a second packet headed for the IP address of the destination host from the source host before an ARP response packet is received in accordance with the ARP request packet and before the routing information corresponding to the IP address of the destination host is acquired for switching the packet based on imaginary routing information.

The packet processing unit preferably comprises a routing table which has IP address information and/or MAC address information of at least one host and MAC address information and dummy port information corresponding to the nonexistent destination IP address set therein.

The packet-processing unit preferably transmits the ARP request packet to the destination host by a preset number for a preset period.

The packet processing unit is preferably responsive to non-receipt of the ARP response packet in accordance with the ARP request packet from the destination host by the preset number for canceling the imaginary MAC address and the dummy port information from the routing table, and is responsive to receipt of a third packet from the source host for resetting new imaginary routing information including imaginary MAC address and dummy port information, and based on the reset imaginary routing information, for transmitting a second ARP request packet to a second destination host so as to acquire actual routing information of the second destination host.

The packet-processing unit is preferably responsive to receipt of the ARP response packet in accordance with the ARP request packet from the destination host by the preset number for updating the routing table with MAC address and port information, included in the ARP response message, which correspond to the IP address of the destination host.

The packet processing unit is preferably responsive to receipt of a fourth packet headed for the IP address of the destination host from the source host after the routing table is updated for switching the fourth packet to a port corresponding to the MAC address information updated into the routing table to transmit to the destination host.

According to yet another aspect of the invention for realizing the above objects, a packet processing apparatus of an ethernet switching system comprises: an ethernet switch for trapping a first packet transmitted from a source host to the CPU if a routing table does not have routing information corresponding to IP address of a destination host of the packet; and an ARP processor for setting imaginary MAC address and dummy port information, corresponding to the IP address of the destination host of the trapped first packet, into the routing table of the ethernet switch, and for transmitting an ARP request packet to the IP address of the destination host so as to acquire MAC address and port information of the destination host, wherein the ethernet switch, upon receipt of a second packet headed for the IP address of the destination host from the source host before an ARP response packet is received in accordance with the ARP request packet, and before the routing information corresponding to the IP address of the destination host is acquired, switches the second packet to a dummy port set in the routing table of the ethernet switch chip without trapping the packet to the CPU.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully hereinafter with reference to the accompanying drawings, in which preferred embodiments of a packet processing apparatus and method of the invention are shown.

Figure 1:
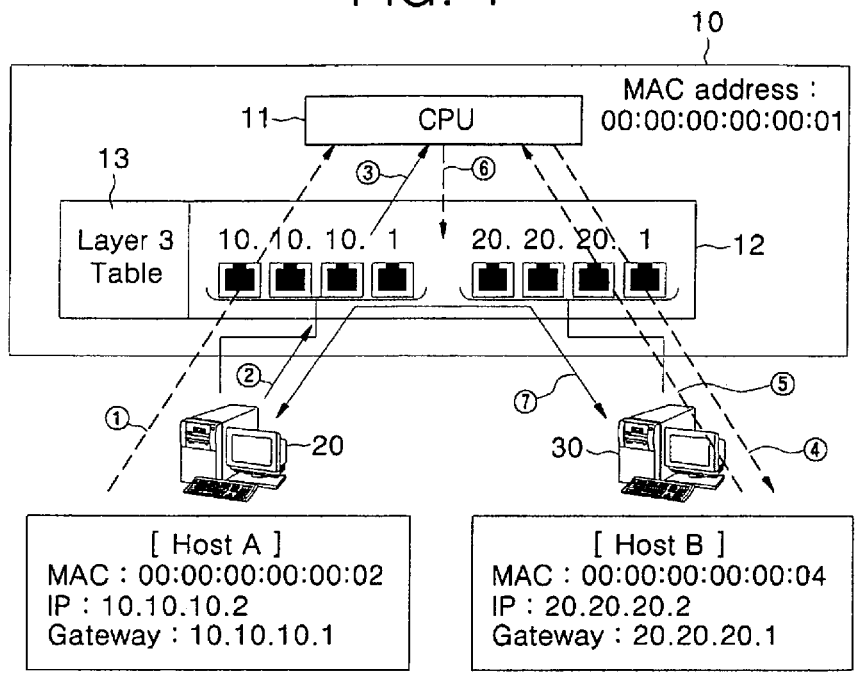
FIG. 1 is an operational diagram illustrating a packet processing apparatus and its packet-processing process in a network system providing a layer 2/3 switching function based on ethernet switches.

FIG. 1 is an operational diagram illustrating a packet forwarding apparatus and its packet-processing process in a network system providing a layer 2/3 switching function based on ethernet switches.

With reference to FIG. 1, a description will be made of an operation in which Internet protocol (IP) address information and Media Access Control (MAC) address information of source and destination hosts are acquired based on an Address Resolution Protocol (ARP).

In the network system, host A 20 attempts to transmit a packet to a host B 30 by means of an ethernet switch chip 12 without the interference of a CPU 11.

The host A 20 broadcasts an ARP packet to the CPU 11 via the ethernet switch chip 12 of an ethernet switch 10 in order to acquire MAC address information of a gateway 10.10.10.1 of the host A 20.

The CPU 11 of the ethernet switch 10 responsively transmits MAC address information 00:00:00:00:00:01 of the ethernet switch 10 to the host A 20 via the ethernet switch chip 12. The CPU 11 also updates IP and MAC addresses of the host A 20 in a layer 3 table 13 of the ethernet switch chip 12.

The host A 20, upon acquiring the gateway MAC address information as described above, transmits a packet with a destination IP address headed for the host B 30 to the ethernet switch chip 12 of the ethernet switch 10. The packet transmitted has a format as shown in Table 1 below.

TABLE 1

| Destination MAC Address | Destination IP Address | Source MAC Address | Source IP Address |
|---|---|---|---|
| 00:00:00:00:00:01 | 20.20.20.2 | 00:00:00:00:00:02 | 10.10.10.1 |

As the packet headed for the host B 30 is received from the host A 20 by means of a switching mechanism, the ethernet switch chip 12 of the ethernet switch 10 confirms whether or not the destination IP address of the packet exists in the layer 3 table 13.

If it is confirmed that the IP address of the host B 30 exists in the layer 3 table 13, the ethernet switch chip 12 transmits the packet to the corresponding IP address, that is, a port connected to the host B 30.

However, if the IP address of the host B 30 does not exist in layer 3 table 13, the ethernet switch chip 12 traps the packet received from the host A 20 to the CPU 11 in order to acquire host MAC address information.

The CPU 11 determines whether the IP address of the destination host B 30 of the trapped packet is included in its own subnet, and if the IP address of the destination host B 30 is included in its own subnet, it determines whether the MAC address of this IP address is known.

If the IP address of the destination host B 30 of the trapped packet is included in its own subnet but the MAC address of the host B 30 is not known, the CPU 11 transmits an ARP packet to this IP address in order to acquire MAC address thereof.

When the CPU 11 transmits the ARP packet to acquire the MAC address of the host B 30, if the host B 30 exists, the host B 30 receives the ARP packet and responsively transmits MAC address information to the CPU 11 via the ethernet switch chip 12. If the host B 30 does not exist, the CPU 11 periodically transmits the ARP packet to the host B 30 until it acquires the MAC address of the host B 30.

If there is a response from the host B 30 as a result of such periodic transmission, the CPU 11 updates the IP address and acquires MAC address information of the host B 30 in the layer 3 table 13 of the ethernet switch chip 12.

As the layer 3 information of the destination host B 30 (that is, the IP address and MAC address information of the host B 30) is updated in the layer 3 table 13, packets are transmitted from the host A 20 to the host B 30 through hardware switching by the ethernet switch chip 12 without interference of the CPU 11.

Figure 2:
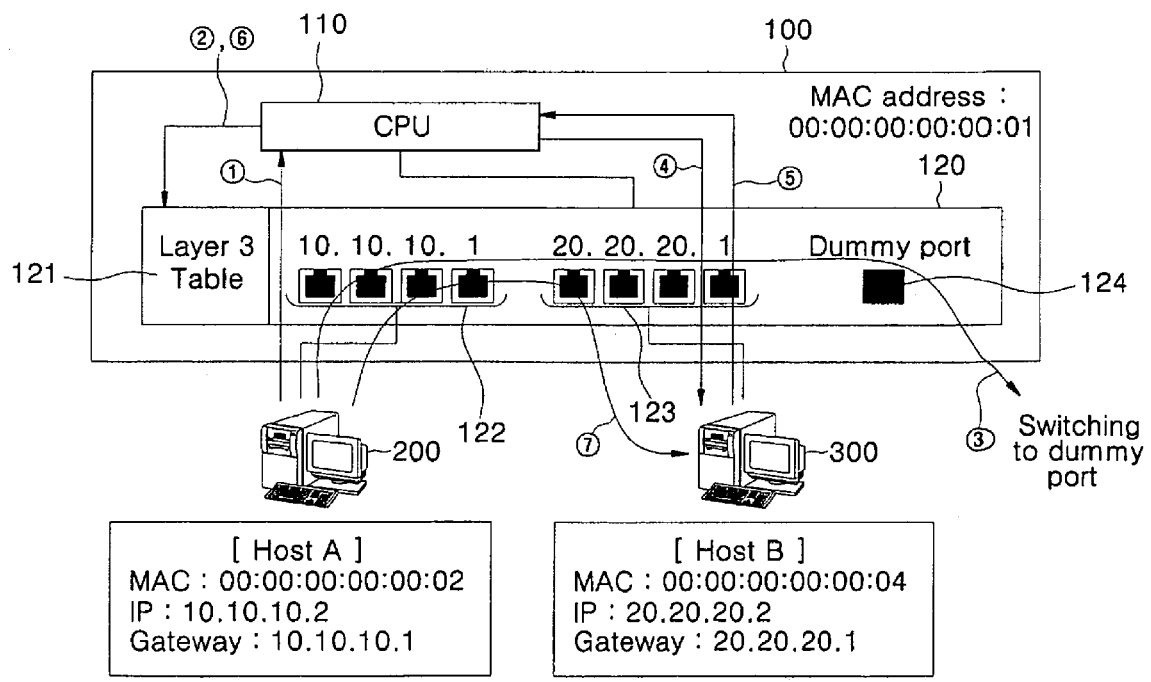
FIG. 2 is an operational diagram illustrating a packet processing apparatus and its packet-processing process in a network system providing layer 2/3 switching function based on ethernet switches according to the invention.

FIG. 2 is an operational diagram illustrating a packet processing apparatus and its packet-processing process in a network system providing layer 2/3 switching function based on ethernet switches according to the invention.

As shown in FIG. 2, the packet processing apparatus of the invention includes an ethernet switch 100 and a plurality of hosts 200 and 300. The ethernet switch 100 includes an ethernet switch chip 120 which has a layer 3 table 121, ports 122 and 123 connected to the hosts 200 and 300 to transmit/receive packets, respectively, and a dummy port 124.

The ethernet switch chip 120, upon receiving a packet from host 200 or 300, searches the layer 3 table 121 to find the MAC address corresponding to the destination IP address, and if the MAC address is found, switches the packet to a port 122 or 123 connected to the destination host so as to transmit the packet to the destination host.

However, if the MAC address corresponding to the IP address of the destination host does not exist, the ethernet switch chip 120 traps the packet to the CPU 110.

In addition, until the CPU 110 acquires the MAC address of the destination host by ARP, the ethernet switch chip 120 also discards any packet received from the source host by switching to the dummy port 124.

From a point in time at which the CPU 110 acquires the MAC address of the corresponding destination host, the ethernet switch chip 120 switches a packet received from the source host to a port connected to the destination host, thereby transmitting the packet to the destination host.

The dummy port 124 of the ethernet switch chip 120 is not a physical port, but exists only by number in the ethernet switch chip 120. Although the dummy port 124 is designated with an available port number which can be accessed by hardware, it is an imaginary port. That is, all packets switched to the dummy port 124 are discarded, and the dummy port 124 cannot receive packets.

The layer 3 table 121 of the ethernet switch chip 120 stores an IP address, a MAC address and port information of each host. In the event that a MAC address corresponding to an IP address of a destination host does not exist in the layer 3 table 121, when a port connected to an imaginary MAC address corresponding to the destination IP address is allocated under the control of the CPU 110, the tables store corresponding imaginary MAC address and dummy port number information to match the destination IP address.

The CPU 110 of the ethernet switch 100 searches the layer 3 table 121 to find a MAC address corresponding to the destination host IP address of the packet trapped by the ethernet switch chip 120. If the corresponding MAC address does not exist, the CPU 110 sets an imaginary MAC address corresponding to the destination host IP address in the layer 3 table 121, and updates the layer 3 table 121 of the ethernet switch chip 120 as if the destination host is connected to the dummy port 124.

After the imaginary MAC address is updated in the layer 3 table 121, the CPU 110 transmits an ARP packet to the destination host IP address in order to find a MAC address corresponding to the actual destination host IP address and port number connected to the destination host. In this case, the transmission number and period of the ARP packet may be preset or reset according to operator selection.

When a response signal to the ARP packet is received from the destination host by the preset transmission number, the CPU 110 cancels the imaginary MAC address information and the dummy port information of the dummy port 124 stored in the layer 3 table 121, and then updates MAC address and port information included in the ARP response signal in the layer 3 table 121.

As the MAC address and port information corresponding to the destination host IP address are updated, the ethernet switch chip 120 refers to the MAC address and port information corresponding to the destination host IP address, and transmits all packets received from the source host to the destination host by switching to a corresponding port.

If the ARP response signal is not received from the destination host by the predetermined transmission number, the CPU 110 cancels the imaginary MAC address information and the dummy port 124 information from the layer 3 table, and then repeats the above-mentioned operation by using the packet trapped by the ethernet switch chip 120.

A detailed description will now be made of the operation of the packet processing apparatus in the ethernet switch 100 which has the above-mentioned construction according to the invention. In the following description of the packet processing operation, it will be assumed that the source host A 200 transmits a packet to the destination host B 300.

First, when the ethernet switch chip 120 receives a packet from the source host A 200 headed for the destination host B 300 existing in the same subnet, the chip 120 confirms whether or not MAC address and port information corresponding to IP address of the destination host B 300 exist in the layer 3 table 121 of the ethernet switch chip 120.

If the MAC address and port information corresponding to the IP address of the destination host B 300 are found in the layer 3 table 121, the ethernet switch chip 120 switches the packet received from the source host A 200 to a corresponding port based on such information so as to transmit the packet to the destination host B 300.

However, if the MAC address and port information corresponding to the IP address of the destination host B 300 are not found in the layer 3 table 121, the ethernet switch chip 120 traps the received packet to the CPU 110.

The CPU 110 confirms again whether or not the MAC address and port information corresponding to the IP address of the destination host B 300 exist in the layer 3 table 121. If the MAC address and port information corresponding to the IP address of the destination host B 300 do not exist in the layer 3 table 121, the CPU 110 sets an imaginary address corresponding to the IP address of the destination host B 300, and updates the imaginary address and a port number into the layer 3 table 121 of the ethernet switch chip 120 as if the destination host B 300 is connected to the dummy port 124.

After the imaginary MAC address and dummy port information are updated in the layer 3 table 121, if packets headed for the IP address of the destination host B 300 are received from the source host A 200, the ethernet switch chip 120 switches the packets to the dummy port 124 set in the layer 3 table 121, thereby discarding the packets.

In the meantime, after the imaginary MAC address and dummy port information on the destination host 300 are updated in the layer 3 table 121, the CPU 110 generates an ARP request packet and transmits it to the IP address of the destination host B 300 in order to acquire actual MAC address and port information of the destination host B 300. In preparation for a situation in which an ARP response packet is not received from the destination host B 300, the ARP request packet may be transmitted by a preset number for a preset period.

If the ARP response packet is received from the destination host B 300 by the preset number, the CPU 110 cancels the imaginary MAC address and dummy port information on the destination host B 300 from the layer 3 table 121 of the ethernet switch chip 120, and then updates the layer 3 table 121 of the ethernet switch chip 120 by matching the actual MAC address and port information of the destination host B 300 to the IP address of the destination host B 300 thereof.

As the layer 3 table 121 of the ethernet switch chip 120 is updated with the MAC address and port information on the destination host B 300 in accordance with the received ARP response packet, the ethernet switch chip 120, upon receiving a packet headed for the destination host B 300 from the source host A 200, switches the packet to an allocated port based on the MAC address and port information corresponding to the IP address of the destination host B 300 stored in the layer 3 table 121.

If the ARP response packet is received from the destination host B 300 by the preset number, the CPU 110 cancels the imaginary MAC address and dummy port information corresponding to the IP address of the destination host B 300 from the layer 3 table 121 of the ethernet switch chip 120. Then, when a packet is received from the source host A 200, the packet is trapped again to the CPU 110 so that the above-described process is carried out again.

Figure 3:
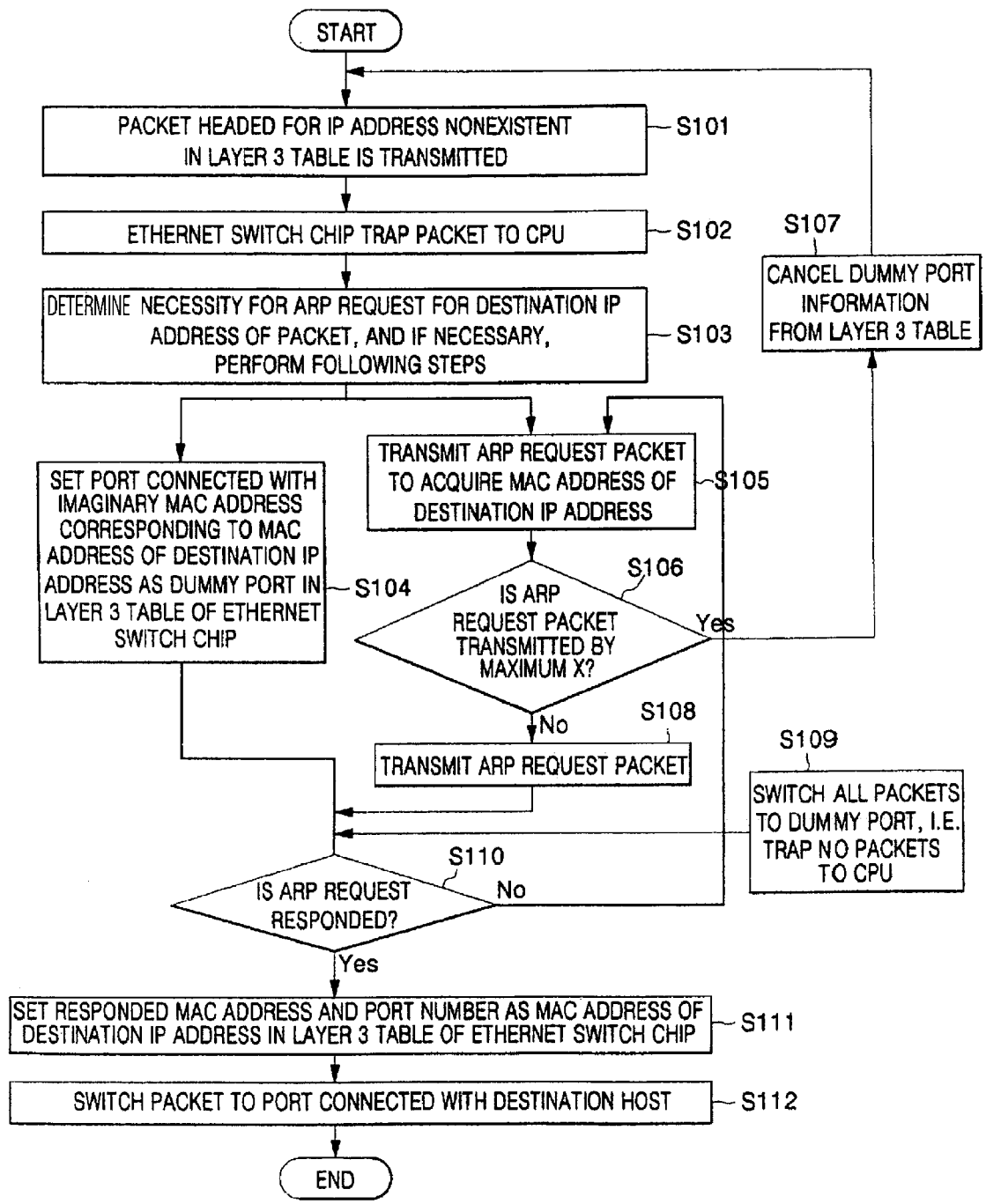
FIG. 3 is a flowchart of a packet processing method carried out by the packet processing apparatus shown in FIG. 2.

FIG. 3 is a flowchart illustrating the packet processing method carried out by the packet processing apparatus shown in FIG. 2.

With reference to FIG. 3, a stepwise description will now be made of a packet processing method corresponding to the operation of the packet processing apparatus in the ethernet switch system according to the invention.

As shown in FIG. 3, if a packet to be transmitted to a destination host is received from a source host of the same subnet, the ethernet switch chip in the ethernet switch confirms whether or not the layer 3 table has MAC address and port information corresponding to the IP address of the destination host. That is, when the packet received from the source host is headed for the destination host with an IP address which does not exist in the layer 3 table of the ethernet switch, the ethernet switch chip confirms whether or not the MAC address and port information of the IP address of the destination host exist in the layer 3 table, and if such information is not found in the layer 3 table, traps the received packet to the CPU in S101 and S102. However, if the MAC address and port information corresponding to the IP address of the destination host are found in the layer 3 table, the ethernet switch chip transmits the packet received from the source host to the destination host by switching based on the corresponding information.

In S103, the CPU determines whether or not it is necessary to make an ARP request for the IP address of the destination host to which the packet trapped from the ethernet switch chip is headed. That is, the CPU determines whether or not the MAC address and port information on the IP address of the destination host are stored in the layer 3 table. If the MAC address and port information on the IP address of the destination host do not exist in the layer 3 table, the CPU determines that it is necessary to generate an ARP request packet for acquiring the MAC address and port information of the destination host.

If it is necessary to transmit the ARP request packet to the destination host, the CPU sets an imaginary MAC address corresponding to the IP address of the destination host in the layer 3 table of the ethernet switch chip, and allocates a port connected to the imaginary MAC address as an imaginary dummy port in S104.

After having allocated the imaginary MAC address and the dummy port corresponding to the imaginary MAC address, the CPU generates an ARP request packet and transmits it to the destination host in order to acquire actual MAC address and port information of the destination host in S105.

In S106, the CPU repeatedly transmits the ARP request packet to the destination host by a preset number for a preset period until there is an ARP response from the destination host. If the ARP response packet is not received from the destination host, even after the ARP request packet is transmitted by the preset number, the CPU cancels the imaginary MAC address and dummy port information of the destination host from the layer 3 table of the ethernet switch chip in S107. Then, the process returns to step S101 to execute the previous steps.

If the ARP request packet is not transmitted to the destination host by the preset number in S106, the CPU continues to transmit the ARP request packet by the preset number in S108, and determines whether or not an ARP response packet is received from the destination host by the preset transmission number in S110. In S109, until the CPU receives an ARP response packet from the destination host and thus acquires MAC address and port information of the destination host, the ethernet switch chip discards packets received from the source host by switching to the dummy port set in the layer 3 table instead of trapping the packets to the CPU.

If an ARP response packet is received from the destination host by the preset transmission number in S110, the CPU acquires MAC address and port information of the destination host included in the ARP response packet received from the destination host, and updates the acquired MAC address and port information in the layer 3 table as MAC address and port information corresponding to the IP address of the destination host in S111.

After the MAC address and port information of the destination host corresponding to the IP address of the destination host are updated in the layer 3 table, when a packet is received from the source host, the ethernet switch chip switches the received packet to the port stored in the layer 3 table so that the received packet can be transmitted to the destination host in S112.

According to the packet processing apparatus and method in the ethernet switch system of the invention, if MAC address and port information corresponding to the destination IP address of a packet received from a host do not exist in the routing table or layer 3 table, the ethernet switch chip of the ethernet switch system traps the packet to the CPU.

When the packet is trapped from the ethernet switch chip, the CPU sets imaginary MAC address and dummy port information corresponding to the IP address of the destination host in the layer 3 table, and then transmits an ARP request packet to the IP address of the destination host in order to acquire actual MAC address and port information of the destination host.

When a packet headed for the IP address of the destination host is received from the same source host before the CPU receives an ARP response packet in accordance with the ARP request packet, and thus acquires the MAC address and port information of the destination host, the ethernet switch chip does not trap the packet to the CPU but discards it by switching to the previously set dummy port.

If an ARP response packet in accordance with the ARP request packet is received from the destination host, the CPU updates MAC address and port information of the destination host included in the received ARP response packet in the layer 3 table of the ethernet switch chip. Then, if a packet headed for the destination host is received from the same source host, the CPU switches the received packet to the updated port of the destination host so that the received packet can be transmitted to the destination host.

Accordingly, when packets headed for the same destination IP are received, only one packet necessary for performing ARP is trapped to the CPU. As a result, the CPU is relieved from unnecessary packets, and thus can ensure resources accordingly.

Furthermore, although a large number of malicious packets headed for a nonexistent destination IP are received, exceeding the processing capability of the CPU, the CPU does not waste its resources to process ARP packets. That is, the CPU can be under hardware control so that it does not waste all resources while processing packets trapped from the ethernet switch chip.

Then, owing to the ensured resources, the CPU can maintain a capability of processing those packets that need processing by the CPU.

While the present invention has been shown and described in connection with the preferred embodiments, it will be apparent to those skilled in the art that modifications and variations can be made without departing from the spirit and scope of the invention as defined by the appended claims.

What is claimed is:

1. A packet processing method in an ethernet switch system, comprising:
   when a routing table does not have routing information corresponding to an Internet Protocol (IP) address of a destination host of a first packet transmitted from a source host, setting imaginary routing information corresponding to the IP address of the destination host in the routing table and transmitting an Address Resolution Protocol (ARP) request packet to the IP address of the destination host to acquire routing information of the destination host, transmitting the ARP request packet comprising transmitting the ARP request packet to the destination host by a preset number;
   upon receiving a second packet headed for the IP address of the destination host from the source host before an ARP response packet is received in accordance with the ARP request packet and before the routing information corresponding to the IP address of the destination host is acquired, switching the second packet based on the imaginary routing information set in the routing table, the imaginary routing information set in the routing table comprising at least one of an imaginary Media Access Control (MAC) address corresponding to the IP address of the destination host and dummy port information;
   when the ARP response packet in accordance with the ARP request packet is not received from the destination host by the preset number, canceling the imaginary routing information from the routing table; and
   upon receiving a third packet from the source host, resetting new imaginary routing information comprising imaginary MAC address and dummy port information, and based on the reset imaginary routing information, transmitting a second ARP request packet to a second destination host to acquire actual routing information of the second destination host.

2. The packet processing method according to claim 1, wherein the routing table comprises a layer 3 routing table.

3. The packet processing method according to claim 1, further comprising:
   when the ARP response packet in accordance with the ARP request packet is received from the destination host by the preset number, updating the routing table with MAC address and port information in an ARP response message and corresponding to the IP address of the destination host.

4. The packet processing method according to claim 3, further comprising:
when a fourth packet headed for the IP address of the destination host is received from the source host after the routing table is updated, switching the fourth packet to a port corresponding to the MAC address information updated in the routing table so as to transmit the fourth packet to the destination host.

5. A packet processing method in an ethernet switch system comprising an ethernet switch chip having a routing table and a central processing unit (CPU), the method comprising:
at the ethernet switch chip, when the routing table does not have routing information corresponding to an Internet Protocol (IP) address of a destination host of a first packet transmitted from a source host, trapping the first packet to the CPU;
at the CPU, setting dummy port information and imaginary Media Access Control (MAC) address corresponding to the IP address of the destination host of the trapped first packet in the routing table of the ethernet switch chip, and transmitting an Address Resolution Protocol (ARP) request packet to the IP address of the destination host so as to acquire MAC address and port information of the destination host; and
at the ethernet switch chip, upon receiving a second packet headed for the IP address of the destination host from the source host before an ARP response packet is received in accordance with the ARP request packet and before the routing information corresponding to the IP address of the destination host is acquired, switching the second packet to a dummy port set in the routing table of the ethernet switch chip without trapping the second packet to the CPU.

6. The packet processing method according to claim 5, wherein the routing table comprises a layer 3 routing table.

7. The packet processing method according to claim 6, wherein transmitting the ARP request packet comprises transmitting the ARP request packet to the destination host by a preset number.

8. The packet processing method according to claim 7, further comprising:
at the CPU, when the ARP response packet in accordance with the ARP request packet is not received from the destination host by the preset number, canceling the imaginary MAC address and the dummy port information from the routing table of the ethernet switch chip, and upon receiving a third packet from the source host, resetting new imaginary routing information comprising imaginary MAC address and dummy port information, in the routing table, and based on the reset imaginary routing information, transmitting a second ARP request packet to a second destination host so as to acquire actual routing information of the second destination host.

9. The packet processing method according to claim 7, further comprising:
at the CPU, when the ARP response packet in accordance with the ARP request packet is received from the destination host by the preset number, updating the routing table with MAC address and port information in an ARP response message and corresponding to the IP address of the destination host.

10. The packet processing method according to claim 9, further comprising:
when a fourth packet headed for the IP address of the destination host is received from the source host after the routing table is updated, switching the fourth packet to a port corresponding to the MAC address information updated in the routing table so as to transmit the fourth packet to the destination host.

11. An ethernet switch system comprising a packet processing unit, wherein the packet processing unit is responsive to receipt, from a source host, of a first packet headed for a destination Internet Protocol (IP) address not existing in the packet processing unit, by transmitting an Address Resolution Protocol (ARP) request packet to the destination IP address so as to acquire routing information of a destination host, and is responsive to receipt of a second packet headed for the IP address of the destination host from the source host before an ARP response packet is received in accordance with the ARP request packet and before the routing information corresponding to the IP address of the destination host is acquired, by switching the packet based on imaginary routing information,
wherein the packet processing unit comprises a routing table comprising at least one of IP address information and Media Access Control (MAC) address information of at least one host, and MAC address information and dummy port information corresponding to the destination IP address not existing in the packet processing unit set therein,
wherein the packet processing unit transmits the ARP request packet to the destination host by a preset number for a preset period, and
wherein the packet processing unit is responsive to non-receipt of the ARP response packet in accordance with the ARP request packet from the destination host by the preset number, by canceling the imaginary routing information from the routing table, and is responsive to receipt of a third packet from the source host for resetting new imaginary routing information, comprising imaginary MAC address and dummy port information, and based on the reset imaginary routing information, by transmitting a second ARP request packet to a second destination host so as to acquire actual routing information of the second destination host.

12. The ethernet switch system according to claim 11, wherein the routing table comprises a layer 3 routing table.

13. The ethernet switch system according to claim 11, wherein the packet processing unit is responsive to receipt of the ARP response packet in accordance with the ARP request packet from the destination host by the preset number by updating the routing table with MAC address and port information in an ARP response message and corresponding to the IP address of the destination host.

14. The ethernet switch system according to claim 13, wherein the packet processing unit is responsive to receipt of a fourth packet headed for the IP address of the destination host from the source host after the routing table is updated by switching the fourth packet to a port corresponding to the MAC address information updated in the routing table so as to transmit the fourth packet to the destination host.

15. A packet processing apparatus of an ethernet switching system, comprising:
an ethernet switch for trapping a first packet transmitted from a source host to a central processing unit (CPU) when a routing table does not have routing information corresponding to an Internet Protocol (IP) address of a destination host; and
an Address Resolution Protocol (ARP) processor for setting dummy port information and an imaginary Media Access Control (MAC) address corresponding to the IP address of the destination host in the routing table of the ethernet switch, and for transmitting an ARP request packet to the IP address of the destination host so as to acquire MAC address and port information of the destination host, wherein the ethernet switch, upon receipt of a second packet headed for the IP address of the destination host from the source host before an ARP response packet is received in accordance with the ARP request packet and before the routing information corresponding to the IP address of the destination host is acquired, switches the second packet to a dummy port set in the routing table of the ethernet switch without trapping the packet to the CPU.

16. The packet processing apparatus according to claim 15, wherein the routing table comprises a layer 3 routing table.

17. The packet processing apparatus according to claim 15, wherein the CPU transmits the ARP request packet to the destination host by a preset number.

18. The packet processing apparatus according to claim 17, wherein the CPU cancels the imaginary MAC address and the dummy port information from the routing table of the ethernet switch when the ARP response packet in accordance with the ARP request packet is not received from the destination host by the preset number.

19. The packet processing apparatus according to claim 17, wherein the CPU updates the routing table with MAC address and port information in the ARP response message and corresponding to the IP address of the destination host when the ARP response packet in accordance with the ARP request packet is received from the destination host by the preset number.

20. The packet processing apparatus according to claim 19, wherein when a third packet headed for the IP address of the destination host is received from a source host after the routing table is updated, the ethernet switch switches the third packet to a port corresponding to the MAC address information updated in the routing table so as to transmit the third packet to the destination host.

* * * * *